United States Patent [19]

Caffarella et al.

[11] 4,045,201

[45] Aug. 30, 1977

[54] METHOD AND APPARATUS FOR SUBDIVIDING A GAS FILLED GLASS TUBE

[75] Inventors: Thomas E. Caffarella; George J. Radda; David J. Watts, all of Tucson, Ariz.

[73] Assignee: American Atomics Corporation, Tucson, Ariz.

[21] Appl. No.: 703,809

[22] Filed: July 9, 1976

[51] Int. Cl.² .......................................... C03B 33/08
[52] U.S. Cl. .................................. 65/105; 65/112; 65/155; 65/270; 65/271
[58] Field of Search .................. 65/56, 105, 112, 155, 65/270, 271

[56] References Cited

U.S. PATENT DOCUMENTS

| | | | |
|---|---|---|---|
| 3,318,512 | 5/1967 | Linlor | 230/69 |
| 3,453,097 | 7/1969 | Hafner | 65/114 |
| 3,701,880 | 10/1972 | Rively et al. | 65/112 UX |
| 3,817,733 | 6/1974 | Thuler | 65/56 |
| 3,839,005 | 10/1974 | Meyer | 65/112 |

*Primary Examiner*—Arthur D. Kellogg
*Attorney, Agent, or Firm*—Christie, Parker & Hale

[57] ABSTRACT

An elongated glass tube light source containing a luminophor and a radioactive gas is subdivided into a plurality of light sources by a plurality of laser beams directed at the tube at spaced points along the length of the tube. The laser beams are scanned back and forth transversely of the length of the tube to heat the tube and fuse the glass at each of the spaced points. The tube is rigidly supported on either side of each of the points to hold the tube stationary during the cutting operation. A single source of a continuous laser beam is divided into a plurality of beams by beam splitters. Mirrors direct the beams to the spaced points along the length of the tube and mirrors are oscillated to provide the desired scanning motion of the beams across the width of the tube.

13 Claims, 5 Drawing Figures

METHOD AND APPARATUS FOR SUBDIVIDING A GAS FILLED GLASS TUBE

Reference is made to application Ser. No. 811,489, filed June 30, 1977, for a continuation-in-part of the present application which claims subject matter disclosed in the present application.

FIELD OF THE INVENTION

This invention relates to the manufacture of tubular radioactive light sources, and more particularly, is concerned with a method and apparatus for subdividing an elongated tube filled with a radioactive gas into a plurality of radioactive light sources.

BACKGROUND OF THE INVENTION

Self-illuminating devices are known which utilize a glass tube coated on the inside with a phosphor and filled with a radioactive gas such as tritium or krypton 85. In the manufacture of very small light sources of this self-illuminating type, it has been the practice to provide an elongated tube which is coated inside with a luminophor, evacuated, filled with the radioactive gas, and sealed at the ends. The tube is then subdivided by cutting the tube into sections by melting the glass, fusing the glass in the process to seal the ends of the sections and prevent escape of the radioactive gas. Laser beams have been used to heat the glass tube in the subdividing process. U.S. Pat. Nos. 3,706,543 and 3,817,733 describe arrangements incorporating laser beams for subdividing radioactive gas-filled tubes.

Various problems have been encountered in applying the techniques described in the prior art. In the prior art, the practice has been to hold the tube in two spaced chucks which rotate the tube in the laser beam so that the beam effectively scans the whole perimeter of the tube during the melting process. In practice, it has been found difficult to rotate the two chucks exactly in unison while the cut is completed. Any slight deviation from perfectly uniform rotation tends to twist the tube slightly or bend it, which may cause fractures. The larger the cross-sectional dimensions of the tube the more difficulty is experienced in maintaining perfect alignment and rotation of the tube during the cutting process.

Another problem encountered is that the tube is not easily cut at more than one point at a time, since each segment must be held and rotated in exact alignment with all the other segments during the cutting process so that no stress is placed on the tube. As a result, it has been the practice to only cut one segment at a time, advancing the tube between cuts to provide successive cuts along the length of the tube. As each cut takes place, the total volume of the radioactive gas is reduced and therefore the pressure is increased. As each section is cut off, the pressure in the remaining portion of the tube increases by an incremental amount. Thus there is a difference in gas pressure between the first segment cut off the tube and the last segment cut from the tube. This results in a nonuniformity of brightness in the successive tube segments. This increase in pressure also requires an adjustment of the external pressure with each successive cut to maintain the pressure differential necessary to achieve proper collapse and fusion of the tube ends as each new segment is cut.

SUMMARY OF THE INVENTION

The present invention provides an improved method and apparatus for subdividing a radioactive gas-filled glass tube into a plurality of separate segments. The tube is held stationary and the laser beam is repeatedly scanned back and forth across to the tube, thus making it easy to mount the tube rigidly without torque or lateral forces being applied which can cause fracturing.

Beam splitters, in the preferred embodiment, permit the beam to be divided and directed to a plurality of cutting positions simultaneously. The simultaneous cuts produce no change in internal gas pressure from one section to another, so that the resulting light sources cut from a single tube have uniform brightness. Furthermore there is no need to adjust the external pressure to maintain optimum pressure differentials during the cutting operation.

These and other advantages of the present invention are achieved by providing apparatus for subdividing a gas-filled glass tube into individual sealed sections comprising clamping means for supporting the tube in fixed position. A laser light beam source is directed by an optical system as two focused beams directed at opposite sides of the tube. The focused beams are scanned back and forth across the width of the tube in a direction transverse to the longitudinal axis of the tube to heat the walls of the tube to a temperature at which the glass softens. The tube collapses from a higher ambient pressure maintained outside the tube than inside the tube.

DESCRIPTION OF THE DRAWINGS

For a more complete understanding of the invention, reference should be made to the accompanying drawings, wherein.

DETAILED DESCRIPTION

Figure 1:
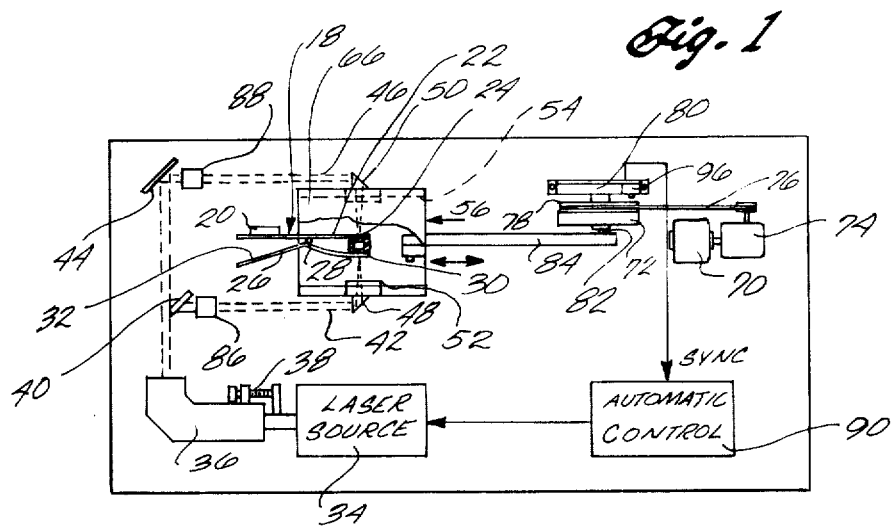
FIG. 1 is a plan view of a device incorporating the features of the present invention.

Referring to the drawings in detail, the numeral 10 indicates generally a supporting base. Mounted on the base 10 is a cover 12 which is sealed by suitable means to the base 10 to provide a fully enclosed space into which gas under pressure can be admitted through a control valve 14. Mounted within the enclosed space is a glass tube radioactive light source 16. The glass tube light source is a hollow glass tube coated on the inside with a luminophor material and filled with a radioactive gas such as tritium or krypton 85. It has been the practice to manufacture the tubes in substantial lengths which are then subdivided into much shorter lengths to provide a plurality of individual self-illuminated light sources which can be grouped or arranged in patterns to form alphanumeric characters or other symbols having visual significance. The elongated tube 16 preferably has an elongated cross section with two wide side surfaces and two narrow side surfaces; it is preferably rectangular in cross-section to provide flat light emitting surfaces, but such tubes may be made in a variety of cross-sectional shapes.

The glass tube 16 is clamped in a fixed vertical position within the pressure chamber by means of a suitable clamping unit 18. The clamping unit 18 includes a vertical support 20 mounted on the base 10. A first rigid clamping member 22 is secured to the support 20 and is bifurcated to form a plurality of spaced clamping fingers 24 which extend on one side of the tube 16. A second clamping member 26 is pivotally supported at 28 to the first clamping member 24 and includes clamping fingers 30 which engage the opposite side of the tube from the clamping fingers 24. A suitable spring 32 produces a clamping pressure between the respective clamping fingers 24 and 30 which acts to rigidly and securely clamp and support the glass tube 16. The clamping fingers 24 and 30 provide intermediate spaces in which the walls of the tube are exposed on either side for cutting by laser beams.

The light beams for cutting and subdividing the tube 16 into segments is derived from a laser source 34 which is preferably a $CO_2$ laser operated in the $TEM_{0,0}$ mode at a wave length of the order of 10.6 microns in the infrared region. It is collimated and directed through a beam bending optical unit 36. The position of the beam immerging at right angles from the bender 36 may be laterally adjusted by a micrometer adjustment 38 so as to control the cross-sectional area of the beam which impinges on a beam splitting mirror 40. The mirror 40 is arranged to direct substantially half the beam along a first beam 42, the undiverted portion of the beam being reflected by a mirror 44 along a second beam 46. The beams 42 and 46, respectively, impinge on 45° mirror surfaces 48 and 50 which direct the beams towards opposite faces of the tube 16. The lenses 52 and 54 focus the respective beams on the two wide side surfaces of tube 16 as shown in FIG 1.

Scanning of the beams across the full width of the wide side surface of the tube is accomplished by mounting the mirrors 48 and 50 and lenses 52 and 54 on a carriage indicated generally at 56. The carriage is supported on the surface of the base plate 10 by suitable rollers 58 or other guide means which guide the carriage to move relative to the base in the direction of the arrows in FIGS. 1 and 2. The carriage is preferably in the form of an open rectangular frame including a top plate 60, bottom plate 62, and side plates 64 and 66. The mirrors 48 and 50 and lenses 52 and 54 are supported on the side plates, the side plates having openings through which the beam passes.

An oscillating motion is imparted to the carriage 56 to cause the beams to be scanned back and forth across the width of the tube 16 to distribute the heating of the glass over the full perimeter of the tube. To this end, a motor 70 drives a fly wheel 72 through a suitable variable speed reducer 74 and belt drive 76. The flywheel 72 is journaled on a shaft 78 projecting from a support bracket 80 mounted on the base 10. An eccentric drive pin 82 projects from the flywheel 72. A link 84 extends between the pin 82 and the carriage 56. The radial distance of the pin 82 relative to the center of the flywheel 72 is preferably made adjustable so as to vary the length of throw to change the distance over which the carriage 56 and associated focused light beams are scanned. Speed reducer 74 may be made adjustable so that the frequency of the oscillation of the carriage 56 can be varied. The frequency of scan is preferably of the order of 10 – 20 hz.

Figure 2:
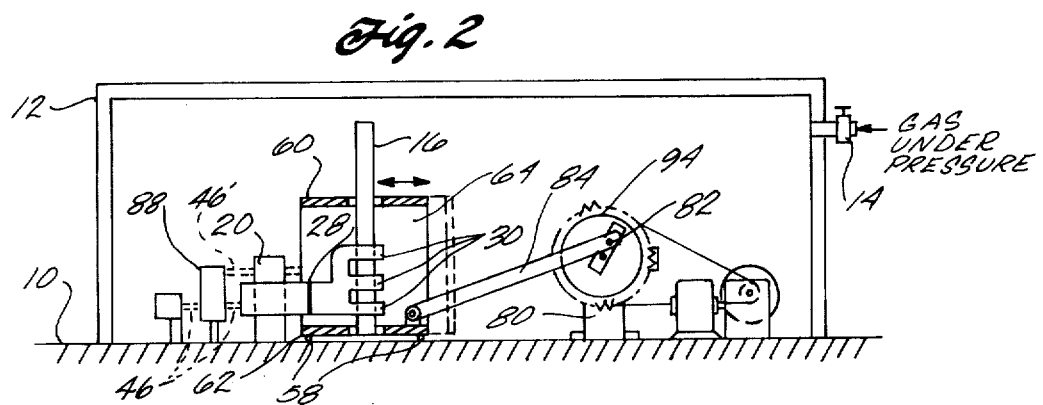
FIG. 2 is an elevational view partially in section of the invention.

More than one cut of the tube 16 can be accommodated by splitting the beams 46 and 42 into two parallel beams one above the other, as indicated at 46 and 46′ in FIG. 2, by suitable beam splitters 86 and 88. Two sets of mirrors 48 and 50 and lenses 52 and 54 are arranged one above the other to focus the respective pairs of beams at two vertically spaced locations along the length of the glass tube 16. It will be appreciated that additional beams may be formed at other vertically spaced positions along the length of the tube 16 to provide any desired number of simultaneous cuts of the tube 16. The clamping fixture 18 should provide sufficient bifurcated clamping fingers to insure that the subdivided tube sections are securely held in place on both sides of each cut.

Figure 4:
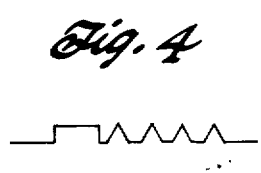
FIGS. 3, 4, and 5 are a series of waveforms used in describing the features of the invention.
Figure 3:
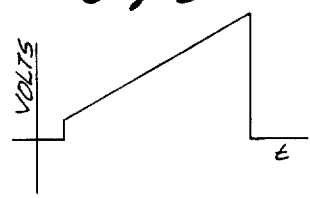
Figure 5:
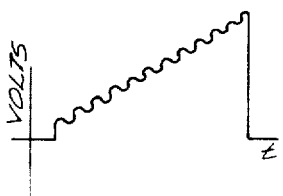

The laser source 34 may be controlled to vary the power of the output beam by the amount of current applied to the plasma tube of the laser source in a well known manner. An automatic control circuit 90 may be provided to control the output of the laser source 34 as a function of time. The control circuit includes means for generating selectable output voltages of different waveforms. FIG. 3 shows a typical modulation waveform showing voltage as a function of time. The beam power of the laser varies directly with the change of modulation voltage from the control circuit. Thus for a simple rectangular shaped tube, for example, the laser beam, varied by the voltage of FIG. 3, has a gradual rise in power. This is desirable to form an effective sealed cut of the tube. It may also be desirable to vary the intensity of the beam as a function of the position of the beam relative to the tube. To this end, a disc 94 having a serrated edge on a plurality of holes may be provided on the flywheel 72 for chopping light detected by a photo detector 96 mounted on the support 80. This provides a periodic signal of the wave shape shown in FIG. 4 consisting of a series of sharp pulses with a single long pulse occuring once each revolution, corresponding to the start of a scan cycle. This signal may be applied to the automatic control circuit 90 to provide a periodic modulation of the beam from the laser source, synchronized with the scanning of the beam across the tube. This periodic signal may be superimposed on the time function signal of FIG. 3 to provide a modulated laser beam having the waveform shown in FIG. 5. For example, the beam intensity may be modulated during each scan cycle so that the beam intensity increases at the edges of the tube where the thickness of glass is the greatest and reduced at the center of the tube where the thickness of glass is the least.

From the above description it will be seen that an arrangement is provided for achieving simultaneous multiple subdivisions of a glass tube radioactive light source in which the tube itself does not have to be rotated or moved during the cutting operation. By providing simultaneous rather than sequential cuts, the pressure in the subdivided sections can be made more uniform. While the mirrors 48 and 50 are shown as being moved linearly by the carriage, other means of scanning the focal point may be used, such as oscillating the plane of the mirrors about a vertical axis to vary the angle of reflection.

What is claimed is:

1. Apparatus for subdividing a gas filled glass tube into individual sealed sections comprising means for supporting a tube in fixed position, means including a laser light beam source for directing a focused laser beam at the tube, means for repeatedly scanning the beam back and forth across the width of the tube along the same path in a direction perpendicular to the longitudinal axis of the tube to heat the wall of the tube to a temperature at which the glass softens, and means for maintaining the gas pressure higher on the outside of the tube than on the inside of the tube causing the softened portion of the tube to collapse.

2. Apparatus of claim 1 wherein said means for directing the laser beam includes means for directing a beam to opposite sides of the tube simultaneously, and the scanning means moves both beams simultaneously across the width of the tube.

3. Apparatus of claim 2 comprising beam splitting means for generating all the beams from a common source.

4. A method of dividing a sealed gas-filled glass tube into sealed segments comprising: directing laser beams simultaneously at the tube from at least two directions at a position along the length of the tube, and scanning the beam across the width of the tube while holding the tube stationary in an ambient atmosphere having a higher pressure than the gas in the tube to heat the entire perimeter of the tube until the tube softens and collapses to form sealed segments.

5. A method of subdividing into individual sealed segments a long, sealed glass tube coated on the inside with a luminophor and filled with a radoactive gas, the tube having a longitudinal axis and a rectangular cross section with two flat wide side surfaces and two flat narrow side surfaces, the method comprising the steps of simultaneously:
holding the long glass tube in a stationary position in an ambient atmosphere having a higher pressure than the gas in the tube; and
repeatedly scanning back and forth across the surface of one of the wide side surfaces of the long glass tube transverse to the longitudinal axis of the tube with a focused laser beam to heat and soften the tube along a cut line until the tube divides to form ends and collapses to seal the divided ends.

6. The method of claim 5, additionally comprising the step of simultaneously repeatedly scanning back and forth across the surface of the other wide side of the long glass tube transverse to the longitudinal axis of the tube along the cut line with a focused laser beam to heat and soften the tube until the tube divides to form ends and collapses to seal the divided ends.

7. The method of claim 6, in which the simultaneous scanning steps are repeated in synchronism.

8. Apparatus of claim 1, wherein the directing means includes a focusing lens through which the laser beam passes as it is directed at the tube, and the scanning means comprises a movable carriage on which the lens is mounted, and means for imparting an oscillating motion to the carriage to cause the beam to scan back and forth across the width of the tube.

9. Apparatus of claim 1, wherein the directing means comprises a single laser light beam source emitting a single laser beam, means for splitting the single laser beam into a first laser beam and a second laser beam traveling adjacent to opposite sides of the tube, and means for reflecting the first and second laser beams onto the respective opposite sides of the tube.

10. Apparatus of claim 9, wherein the first and second beams are parallel to each other as they travel adjacent to the opposite sides of the tube, the directing means additionally comprises first and second lenses in the path of the first and second laser beams, respectively, between the reflecting means and the opposite sides of the tube for focusing the respective first and second laser beams, and the scanning means comprises a movable carriage on which the first and second lenses are mounted, and means for imparting an oscillating motion parallel to the first and second beams to the carriage.

11. Apparatus of claim 1, wherein the gas pressure maintaining means comprises a sealed chamber and a gas control valve through which gas under pressure is supplied to the chamber.

12. The method of claim 4, in which the directing step directs the laser beams simultaneously in diametrically opposing directions at opposite sides of the tube, and the scanning step scans the beams back and forth across the opposite sides of the tube.

13. A method of subdividing into individual sealed segments a long, sealed glass tube coated on the inside with a luminophor and filled with a radioactive gas, the tube having a longitudinal axis and an elongated cross section with at least one wide side surface, the method comprising the steps of simultaneously:
holding the long glass tube in a stationary position in an ambient atmosphere having a higher pressure than the gas in the tube; and
repeatedly scanning back and forth across the surface of one of the wide side surface of the long glass tube transverse to the longitudinal axis of the tube with a focused laser beam to heat and soften the tube along a cut line until the tube divides to form ends and collapses to seal the divided ends.

* * * * *